(12) United States Patent
Zeng et al.

(10) Patent No.: US 9,392,544 B2
(45) Date of Patent: Jul. 12, 2016

(54) WIRELESS DIGITAL COMMUNICATION METHOD AND SYSTEM

(71) Applicant: Goertek Inc, Weifang (CN)

(72) Inventors: Xiaobo Zeng, Weifang (CN); Qiang Gao, Weifang (CN); Chongle Wang, Weifang (CN)

(73) Assignee: GOERTEK INC., Weifang (CN)

( * ) Notice: Subject to any disclaimer, the term of this patent is extended or adjusted under 35 U.S.C. 154(b) by 513 days.

(21) Appl. No.: 13/988,369

(22) PCT Filed: Sep. 28, 2012

(86) PCT No.: PCT/CN2012/082328
§ 371 (c)(1),
(2) Date: May 20, 2013

(87) PCT Pub. No.: WO2013/044851
PCT Pub. Date: Apr. 4, 2013

(65) Prior Publication Data
US 2013/0243219 A1    Sep. 19, 2013

(30) Foreign Application Priority Data

Sep. 30, 2011  (CN) .......................... 2011 1 0293846
Sep. 30, 2011  (CN) .......................... 2011 1 0294559
Sep. 30, 2011  (CN) .......................... 2011 1 0295132

(51) Int. Cl.
*H04B 3/00* (2006.01)
*H04W 52/02* (2009.01)
*H04L 1/00* (2006.01)
*H04L 1/18* (2006.01)

(52) U.S. Cl.
CPC ......... *H04W 52/0225* (2013.01); *H04L 1/0006* (2013.01); *H04L 1/0025* (2013.01); *H04L1/1854* (2013.01); *H04L 1/1887* (2013.01); *H04L 2001/0093* (2013.01); *Y02B 60/50* (2013.01)

(58) Field of Classification Search
CPC ....... H04L 1/16; H04L 1/1614; H04L 1/1685; H04L 1/18; H04L 12/1868; H04L 12/189; H04L 12/1863; H04L 12/5695; H04L 2001/0093; H04L 47/10; H04L 47/2441; H04L 49/201; H04L 61/2069; H04L 65/4076; H04W 52/02; H04W 52/0209; H04W 72/1289; H04W 28/04; H04W 4/06; H04W 72/005; H04W 84/12; H04W 92/10; H04J 14/0227; H04J 14/0228; H04J 14/0238; H04B 7/18584; H04Q 2011/0047
USPC ............. 381/77, 78, 80, 81, 82, 85, 123, 119, 381/61, 300, 302, 301, 303, 305, 307, 311, 381/22, 23; 455/3.01, 3.04, 3.05, 3.06, 405, 455/412.1, 412.2, 423, 424, 426.1, 426.2, 455/434, 435.1, 455, 461, 9, 14, 24, 41.2, 455/500, 502, 509, 515, 516, 66.1, 67.11, 455/569.1, 575.2; 370/329, 331, 332, 333, 370/431, 437, 468, FOR. 149; 700/94
See application file for complete search history.

(56) References Cited

U.S. PATENT DOCUMENTS

| 4,888,767 | A  | * | 12/1989 | Furuya ................. | H04L 1/0061 370/243 |
|---|---|---|---|---|---|
| 5,164,938 | A  | * | 11/1992 | Jurkevich ............. | H04J 3/1682 370/231 |
| 6,816,475 | B1 | * | 11/2004 | Pattavina ............. | H04J 3/1623 370/336 |
| 2003/0101387 | A1 | * | 5/2003 | Lee ....................... | H04L 1/0007 714/704 |
| 2005/0058116 | A1 | * | 3/2005 | Palin ..................... | H04L 1/18 370/345 |
| 2005/0176420 | A1 | * | 8/2005 | Graves ................. | H04W 48/16 455/424 |
| 2007/0140167 | A1 | * | 6/2007 | Jang ..................... | H04W 72/10 370/329 |
| 2007/0189207 | A1 | * | 8/2007 | Sammour ............. | H04L 1/1614 370/328 |
| 2007/0191024 | A1 | * | 8/2007 | Kim ...................... | H04L 1/0003 455/456.2 |
| 2008/0112375 | A1 | * | 5/2008 | Bennett ................ | H04L 1/0007 370/338 |

* cited by examiner

Primary Examiner — Leshui Zhang
(74) Attorney, Agent, or Firm — Troutman Sanders LLP

(57) ABSTRACT

The present invention discloses a wireless digital communication method and a wireless digital communication system, relates to the technical field of wireless communication, and can increase the flexibility of communication in a wireless audio transmission system and the utilization ratio of resources of the system and effectively reduce the power consumption of the system. A wireless digital communication method according to an embodiment of the present invention comprises: acquiring communication status indication information which indicates a receiving terminal status and/or a channel status; generating frame structure adjustment information when it is known from the communication status indication information that a communication status has changed, and transmitting the frame structure adjustment information to a corresponding receiving terminal, wherein the frame structure adjustment information comprises radio packet adjustment information; and adjusting an adopted frame structure according to the frame structure adjustment information and performing data communication with the receiving terminal according to the adjusted frame structure. This solution applies to various wireless communication systems having high requirements on the transmission quality.

11 Claims, 6 Drawing Sheets

WIRELESS DIGITAL COMMUNICATION METHOD AND SYSTEM

This application claims priority to PCT/CN2012/082328 filed Sep. 28, 2012 and to Chinese Appl. Nos. 201110294559.6, 201110293846.5 and 201110295132.8, all filed Sep. 30, 2011

TECHNICAL FIELD

The present invention relates to the technical field of wireless communication, and more particularly, to a wireless digital communication method and a wireless digital communication system.

DESCRIPTION OF RELATED ART

With the advancement of wireless digital transmission technologies and especially the appearance of on-chip systems based on the 2.4 GHz frequency band and having characteristics of low power consumption, low radiation, low cost and so on, it becomes possible to widely use the wireless digital transmission technologies in wireless digital audio products.

Currently, the wireless digital audio transmission technologies mainly include three wireless transmission ones based on the Wireless Fidelity (WiFi), the Bluetooth and other propriatory 2.4 GHz technology. Among these, the wireless audio transmission technology based on the WiFi has the advantage of a high bandwidth, but results in such problems as high power consumption and high radiation due to the large transmitting power of the WiFi; the wireless audio transmission technology based on the Bluetooth is relatively mature, but suffers from a higher latency in real time audio transmission; and the wireless transmission technology based on propriatory 2.4 GHz technology has advantages of low power consumption, low radiation, low cost and so on.

Related products of the wireless digital audio systems are usually powered with batteries, so the systems have high requirements on the power consumption, and a wireless digital earphone system also requires low radiation as they have a feature of being used near human bodies. Moreover, as a system for transmitting audio data real time, the wireless digital earphone system also requires a wireless system to have a low latency and high reliability. Accordingly, most of the wireless digital earphone systems currently available adopt the 2.4G transmission technology to meet the requirements of low power consumption, low latency and low radiation.

However, the current wireless audio transmission technology based on the 2.4G has not become mature enough yet. In an audio system of the wireless transmission technology based on the 2.4G currently available, a frame structure with a fixed radio packet is mainly adopted. The adopted frame structure is specified in advance for an earphone terminal in the system, and corresponding bandwidth resources are reserved for the earphone terminal. Thus, during wireless communication, audio data are transmitted at the reserved bandwidth according to the predetermined frame structure.

This treatment manner currently adopted leads to waste of the bandwidth resources of the system and increases the power consumption of the system. For example, the existing wireless audio communication manner is only for communication systems of a fixed scenario, and the preset frame structure is also only suitable for use in the transmitting terminal and the earphone terminal in the fixed scenario, so this communication manner is not flexible enough. Moreover, when the communication scenario changes, the preset frame structure very likely becomes unsuitable for use in a new scenario, making transmission of audio data impossible. Furthermore, in the existing frame structure, multiple retransmission packets are set for a data packet; however, when the data packet is normally transmitted, it is unnecessary to retransmit the data. This treatment manner currently adopted not only wastes the bandwidth of the system but also increases the power consumptions of the transmitting terminal and the earphone terminal because each frame transmitted comprises multiple retransmission packets in any case.

BRIEF SUMMARY OF THE INVENTION

Embodiments of the present invention provide a wireless digital communication method and a wireless digital communication system capable of increasing the flexibility of communication in a wireless audio transmission system, increasing the utilization ratio of resources of the system and effectively reducing the power consumption of the system.

To achieve the aforesaid objects, the technical solutions according to embodiments of the present invention are realized as follows.

An embodiment of the present invention provides a wireless digital communication method, which comprises:

acquiring communication status indication information which indicates a receiving terminal status and/or a channel status;

generating frame structure adjustment information when it is known from the communication status indication information that a communication status has changed, and transmitting the frame structure adjustment information to a corresponding receiving terminal, wherein the frame structure adjustment information comprises radio packet adjustment information; and adjusting an adopted frame structure according to the frame structure adjustment information and performing data communication with the receiving terminal according to the adjusted frame structure.

An embodiment of the present invention provides another wireless digital communication method, which comprises:

receiving frame structure adjustment information from a transmitting terminal, wherein the frame structure adjustment information comprises radio packet adjustment information, the frame structure adjustment information is generated by the transmitting terminal according to communication status indication information when it is leaned that a communication status has changed, and the communication status indication information indicates a receiving terminal status and/or a channel status; and adjusting an adopted frame structure according to the frame structure adjustment information and performing data communication with the transmitting terminal according to the adjusted frame structure.

An embodiment of the present invention further provides a wireless digital communication system, which comprises a transmitting terminal apparatus and a receiving terminal apparatus, wherein:

the transmitting terminal apparatus comprises:

a communication status acquiring unit, being configured to acquire communication status indication information which indicates a receiving terminal status and/or a channel status;

an adjustment information generating unit, being configured to generate frame structure adjustment information when knowing from the communication status indication information that a communication status has changed, and transmit the frame structure adjustment information to a corresponding receiving terminal, wherein the frame structure adjustment information comprises radio packet adjustment information; and a first frame structure adjusting unit, being configured to adjust an adopted frame structure according to the frame structure adjustment information and perform data communication with the receiving terminal according to the adjusted frame structure; and the receiving terminal apparatus comprises:

an adjustment information receiving unit, being configured to receive the frame structure adjustment information generated by the adjustment information generating unit from a transmitting terminal, wherein the frame structure adjustment information comprises radio packet adjustment information; and a second frame structure adjusting unit, being configured to adjust the adopted frame structure according to the frame structure adjustment information and perform data communication with the transmitting terminal according to the adjusted frame structure.

As can be seen from the above description, the technical solution according to the embodiments of the present invention provides a new wireless digital audio communication solution, which makes a corresponding adjustment strategy according to the acquired actual communication status of the system and makes the receiving terminal and the transmitting terminal informed of the adjustment strategy through the generated frame structure adjustment information. Thereby, a wireless communication manner of dynamically changing the adopted frame structure according to the communication status is achieved. This significantly increases the flexibility of the wireless audio transmission system, ensures successful accomplishment of audio communication in various communication scenarios, and improves the user's experience.

Further, by dynamically adjusting the frame structure, this solution can flexibly set the specific contents of a radio packet needing to be transmitted, thus controlling resources of the system that need to be occupied. This can reduce the power consumption of the system to the maximum extent and increase the utilization ratio of the resources of the system while meeting the requirements of high reliability, low latency and low radiation. Thereby, this solution is relatively more practical and has wide prospect of applications.

BRIEF DESCRIPTION OF THE SEVERAL VIEWS OF THE DRAWINGS

To describe the technical solutions of embodiments of the present invention or of the prior art more clearly, the attached drawings necessary for description of the embodiments or the prior art will be introduced briefly hereinbelow. Obviously, these attached drawings only illustrate some of the embodiments of the present invention, and those of ordinary skill in the art can further obtain other attached drawings according to these attached drawings without making inventive efforts.

DETAILED DESCRIPTION OF THE INVENTION

The data transmission problem solved by the communication method and the communication system of this solution, which is a basic problem in the field of wireless digital communication, is attributed to two individual terminals of the wireless digital communication that are independent from each other, so a communication method has to be achieved at both parties of the communication link. This method ensures normal operation of the communication link, and ensures normal transmission and reception of radio packets. It shall be understood that, this solution is not limited to wireless earphone systems, and applies to other communication systems having high requirements on the transmission quality such as wireless video systems, wireless data collection systems, wireless data transmission systems, or the like.

The technical concept of the present invention is mainly as follows: dynamically changing a frame structure for periodically transmitting a radio packet in the communication link according to a communication status in a wireless digital earphone system (e.g., the number of earphone terminals in the system, the communication channel quality or the like) to achieve a high-quality and high-reliability communication method for use in the wireless digital earphone system, which can increase the utilization ratio of the wireless transmission bandwidth and effectively reduce the power consumption of the system.

Figure 1:
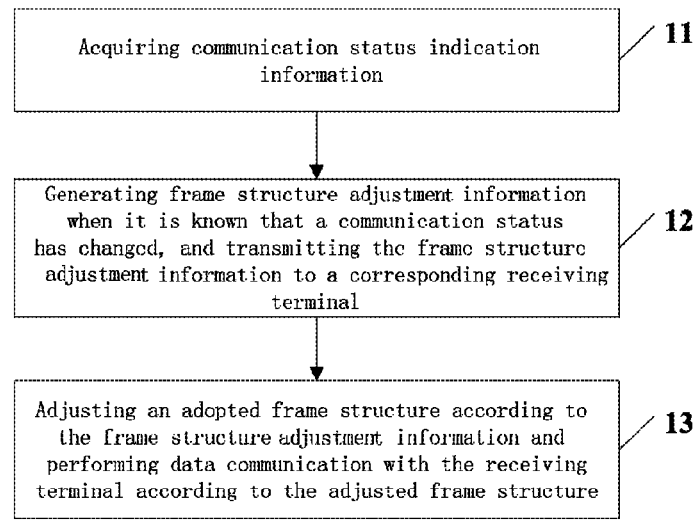
FIG. 1 is a schematic flowchart diagram of a wireless digital communication method according to an embodiment I of the present invention.

An embodiment I of the present invention provides a wireless digital communication method. Referring to FIG. 1, the method comprises:

11: acquiring communication status indication information which indicates a receiving terminal status and/or a channel status;

12: generating frame structure adjustment information when it is known from the communication status indication information that a communication status has changed, and transmitting the frame structure adjustment information to a corresponding receiving terminal, wherein the frame structure adjustment information comprises radio packet adjustment information; and 13: adjusting an adopted frame structure according to the frame structure adjustment information and performing data communication with the receiving terminal according to the adjusted frame structure.

The step 11 to the step 13 aforesaid can be accomplished by an apparatus at a network side (e.g., a transmitting terminal apparatus in a wireless communication network), and the aforesaid receiving terminal may be a terminal apparatus (e.g., an earphone terminal) corresponding to the transmitting terminal apparatus.

Further, the aforesaid receiving terminal status may indicate the receiving terminal that has been connected (i.e., the receiving terminal that has been connected with the transmitting terminal); or the aforesaid receiving terminal status may also indicate whether the receiving terminal has successfully received a corresponding data packet. The aforesaid channel status indicates the current channel quality of the communication system.

As can be seen from the above description, the technical solution according to this embodiment of the present invention provides a new wireless digital audio communication solution, which makes a corresponding adjustment strategy according to the acquired actual communication status of the system and makes the receiving terminal and the transmitting terminal informed of the adjustment strategy through the generated frame structure adjustment information. Thereby, a wireless communication manner of dynamically changing the adopted frame structure according to the communication status is achieved. This significantly increases the flexibility of the wireless audio transmission system, ensures successful accomplishment of audio communication in various communication scenarios, and improves the user's experience.

Further, by dynamically adjusting the frame structure, this solution can flexibly set the specific contents of a radio packet needing to be transmitted, thus controlling resources of the system that need to be occupied. This can reduce the power consumption of the system to the maximum extent and increase the utilization ratio of the resources of the system while meeting the requirements of high reliability, low latency and low radiation. Thereby, this solution is relatively more practical and has wide prospect of applications.

For convenience of clearly describing the technical solution according to the embodiments of the present invention, letters and reference numerals such as "first", "second", "1", "2" and the like are used in the embodiments of the present invention to differentiate between the same items or similar items having substantially the same functions and roles, and it can be understood by people skilled in the art that these letters and reference numerals are not intended to limit the number and the execution order.

Hereinbelow, a wireless digital communication method according to an embodiment II of the present invention will be described with reference to FIG. 2 to FIG. 10. In this embodiment of the present invention, the description will be made by taking the scenario where wireless digital communication is carried out between a transmitting terminal and an earphone terminal as an example. It shall be understood that, this solution is not limited to wireless digital earphone communication systems, and may also apply to other communication systems such as wireless video systems, wireless data collection systems, wireless data transmission systems, or the like. For convenience of clearly describing this solution, one application scenario according to this embodiment of the present invention will be firstly described hereinbelow with reference to FIG. 2.

Figure 2:
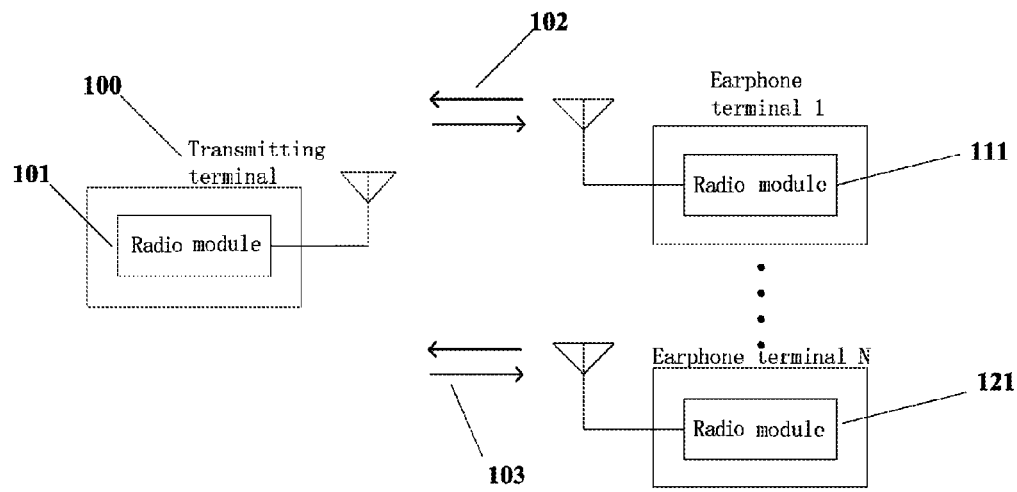
FIG. 2 is a schematic view of a basic frame of a wireless digital earphone system according to an embodiment II of the present invention.

FIG. 2 shows a schematic view of a basic frame of a wireless digital earphone system. The wireless digital earphone system consists of one transmitting terminal 100 and multiple earphone terminals (e.g., an earphone terminal 1 to an earphone terminal N, where N is a reference numeral and the value of N may vary with the actual conditions of the system). The transmitting terminal 100 transmits radio packets comprising audio data to the individual earphone terminals through a radio module 101 and receives reply packets 102 returned from the individual earphone terminals, and the radio packets each may comprise a data packet 103 (or a control packet 103). The individual earphone terminals receive through respective radio modules (e.g., a radio module 111 and a radio module 121) the data packets 103 (or the control packets 103) transmitted to a channel by the transmitting terminal and return the reply packets 102 to the transmitting terminal.

It shall be understood that when the basic blocks of FIG. 2 are applied to other wireless digital communication systems, these wireless digital communication systems each comprises one data transmitting terminal and multiple data receiving terminals, with the data transmitting terminal transmitting data to the individual receiving terminals and the data receiving terminals receiving the data from the transmitting terminal and returning reply packets.

In the wireless digital earphone system, the transmitting terminal packs the obtained audio data by means of radio packets and transmits the radio packets into the channel through the radio module, and the earphone terminals receive the radio packets from the channel through the radio modules and restore the radio packets into the audio data.

The frame structure mentioned in the embodiments of the present invention refers to an organization structure of a periodic radio packet used in the wireless digital communication system, and the frame structure is determined by the number of radio packets of the frame needing to be actually transmitted, the number of reply packets needing to be transmitted/received and the like. The aforesaid radio packets needing to be transmitted in this solution may comprise one or more of a data packet, a reselection packet, a reply packet, a control packet and so on as needed.

The aforesaid data packet is used to transmit audio data needing to be transmitted within one frame period, the size of the data packet is determined by the radio module of the system, and the number of the data packet is determined by the frame period and the audio data sampling rate.

The aforesaid reply packet is used to transmit description information on the conditions of receiving all the radio packets by the earphone terminals within one frame period.

The aforesaid control packet is used to transmit control information necessary in the communication, and the control packet may be used to transmit the generated frame structure adjustment information in this solution.

In consideration of existence of channel interference, this solution generally organizes the frame structure of radio transmission by means of the data packets plus the retransmission packets, and ensures reliable transmission of the audio data through the use of the retransmission packets. The number of the retransmission packets may be determined by the radio bandwidth, and a large number of retransmission packets may be used in a high bandwidth system to ensure reliable transmission of the audio data.

The aforesaid retransmission packets are used to transmit data packets lost within a time range before the current frame period. Specifically, the aforesaid retransmission packets are used to transmit data packets within the retransmission packet effective range that need to be retransmitted. For a certain retransmission packet, the aforesaid retransmission packet effective range refers to a range of data packets before the current frame period that can be retransmitted by the retransmission packet. For example, the retransmission packet effective range used by the wireless digital earphone system is 8 frame periods, then a retransmission packet A is obtained in the current frame period N, and the data packets that can be retransmitted are any data packets lost within the $(N-8)^{th}$ frame period to the $(N-1)^{th}$ frame period. The $(N-8)^{th}$ frame period to the $(N-1)^{th}$ frame period here is referred to as the effective range of the retransmission packets of the $N^{th}$ frame.

Figure 4:
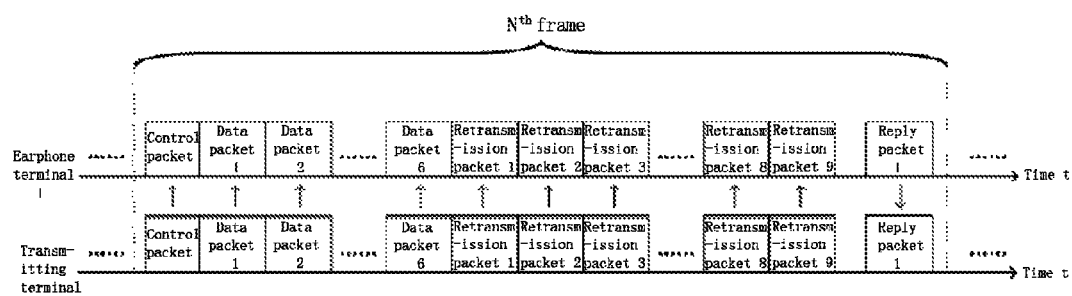
FIG. 4 is a schematic view of a frame structure used in communication of the wireless digital earphone according to the embodiment II of the present invention.

Referring to FIG. 4, there is shown an example of a frame structure according to the embodiment of the present invention in a scenario of one transmitting terminal and one earphone terminal. In this example, the radio transmission bandwidth at most allows for use of 1 control packet, 6 data packets, 9 retransmission packets and 1 reply packet.

Figure 3:
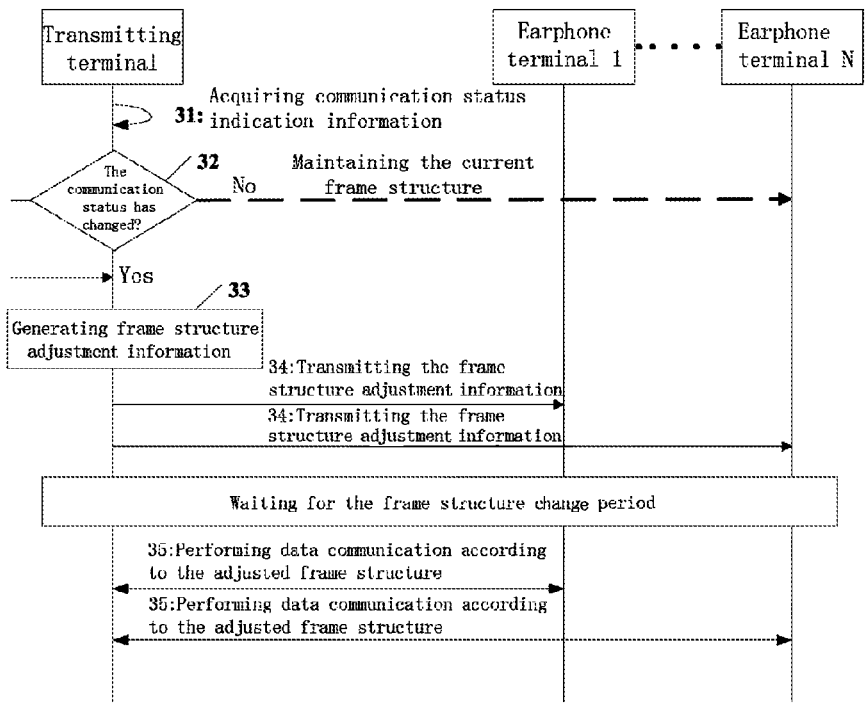
FIG. 3 is a schematic flowchart diagram of a communication method of a wireless digital earphone according to the embodiment II of the present invention.

Based on the basic architecture of FIG. 2 and referring to FIG. 3, the communication method of the wireless digital earphone according to this embodiment of the present invention comprises the following process.

31: Acquiring communication status indication information by the transmitting terminal.

The aforesaid communication status indication information indicates an earphone terminal status and a channel status. Depending on different contents of the communication status indication information, the way of acquiring the information is different. For example, if the earphone terminal status indicates that the earphone terminal has been connected (i.e., the earphone terminal has been connected with the transmitting terminal), then the transmitting terminal acquires and records the communication status indication information (i.e., acquires and records the earphone terminal status of the earphone terminal that has been connected) by detecting the connection status of the earphone terminal;

if the earphone terminal status indicates whether the earphone terminal has successfully received a corresponding data packet, then the transmitting terminal acquires the communication status indication information (i.e., acquires the earphone terminal status indicating whether the earphone terminal has successfully received the corresponding data packet) according to a reply packet received from the earphone terminal; and if the channel status indicates the current channel quality of the communication system, the transmitting terminal acquires the communication status indication information (i.e., acquires the channel status indicating the current channel quality of the communication system) by detecting the channel status.

32: Determining whether the communication status has changed. If the answer is "yes", then step 33 is executed; and otherwise, if the answer is "no", then the current frame structure is still used for data transmission.

It is known from the communication status indication information that the communication status has changed. For example:

if the acquired previous communication status indication information (e.g., the $(t-1)^{th}$ communication status indication information) indicates that the first earphone terminal has been connected with the transmitting terminal and the current communication status indication information (e.g., the $t^{th}$ communication status indication information) indicates that the first earphone terminal is disconnected from the transmitting terminal, then it is determined that the communication status has changed (i.e., there is an earphone terminal whose connection is lost and which is disconnected from the wireless communication system).

If the acquired previous communication status indication information (e.g., the $(t-1)^{th}$ communication status indication information) indicates that the second earphone terminal is not connected with the transmitting terminal and the current communication status indication information (e.g., the $t^{th}$ communication status indication information) indicates that the second earphone terminal is successfully connected with the transmitting terminal, then it is determined that the communication status has changed (i.e., a new earphone terminal is added into the wireless communication system).

If the channel quality indicated by the acquired first communication status indication information (e.g., the $t^{th}$ communication status indication information) is higher than the channel quality indicated by the second communication status indication information (e.g., the $(t-3)^{th}$ communication status indication information), then it is determined that the communication status has changed (i.e., the channel condition becomes better and the channel quality is improved).

33: Generating frame structure adjustment information.

The transmitting terminal obtains the current actual communication status of the system according to the aforesaid communication status indication information, makes a corresponding adjustment strategy, and makes the earphone terminal and the transmitting terminal informed of the adjustment strategy through the generated frame structure adjustment information. The change contents indicated by the communication status indication information are different, and the specific contents of the generated frame structure adjustment information are also different. At least the following four cases are comprised.

First Case

In this case, the earphone terminal status in the communication status indication information indicates the earphone terminal that is connected with the transmitting terminal, and it is known from the communication status indication information that there exists at least one second earphone terminal. The second earphone terminal satisfies the following conditions: the previous communication status indication information indicates that the second earphone terminal is not connected with the transmitting terminal and the current communication status indication information indicates that the second earphone terminal is successfully connected with the transmitting terminal (i.e., a new earphone terminal is added into the wireless communication system).

The aforesaid frame structure adjustment information comprises radio packet adjustment information. In this case, the generated radio packet adjustment information indicates adding a reply packet corresponding to the second earphone terminal into the frame structure. Here, the specific description will be made with reference to the scenario of FIG. 4. FIG. 4 shows an example of the frame structure before the communication status changes, FIG. 5 shows an example of the frame structure obtained through adjustment after one new earphone terminal is connected in the system (i.e., FIG. 5 shows an example of the frame structure after the communication status changes).

Figure 5:
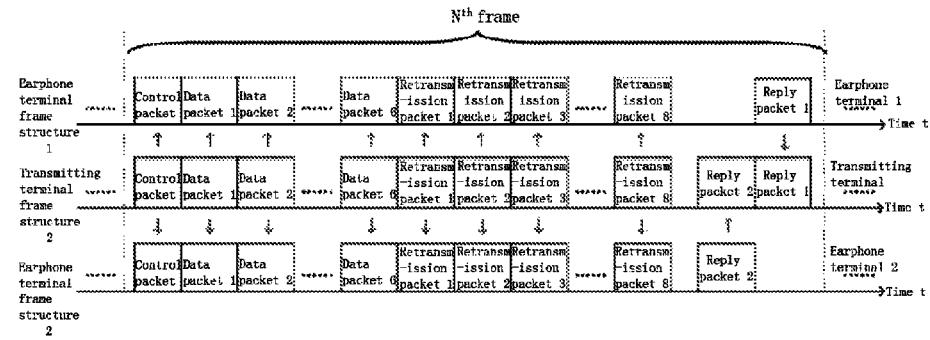
FIG. 5 is a schematic view of a frame structure according to the embodiment II of the present invention that is obtained through adjustment after one new earphone terminal and a transmitting terminal are connected in the scenario of FIG. 5.

The frame structure of FIG. 5 mainly differs from the frame structure of FIG. 4 in that, the number of the retransmission packets is reduced in the frame structure of the transmitting terminal. The purpose of reducing the number of the retransmission packets is for releasing the bandwidth resources occupied by the retransmission packets so as to allocate the bandwidth to the reply packet (the reply packet 2 shown in FIG. 4) of the newly added earphone terminal 2 (i.e., the second earphone terminal), thereby accomplishing transmission of the reply packet of the earphone terminal 2.

The frame structure of FIG. 4 has reached the maximum support capacity of the radio transmission bandwidth, so here the number of the retransmission packets must be reduced when a new earphone terminal is added. Moreover, 1 retransmission packet reduced here is only illustrative, and it is also possible to reduce multiple retransmission packets so long as it can be ensured to delete from the frame structure one or more retransmission packets requiring radio bandwidth no smaller than the radio bandwidth occupied by the added reply packet. When the radio bandwidth occupied by the retransmission packet is identical to the radio bandwidth occupied by the reply packet, the number of the retransmission packets reduced is larger than or equal to the number of the necessary newly added reply packets. It shall be understood that, if there are sufficient bandwidth resources in the system, it may also be unnecessary to reduce the number of the retransmission packets.

As described above, when the generated radio packet adjustment information indicates adding a reply packet corresponding to the second earphone terminal into the frame structure, the aforesaid radio packet adjustment information may further indicate deleting from the frame structure of the transmitting terminal a retransmission packet requiring radio bandwidth no smaller than radio bandwidth occupied by the added reply packet (i.e., the radio bandwidth necessary for the deleted retransmission packet is no smaller than the radio bandwidth occupied by the added reply packet); or deleting from the frame structure of the transmitting terminal retransmission packet requiring radio bandwidth no smaller than the radio bandwidth occupied by the added reply packet and adjusting in the frame structure a timing position at which the reply packet of the earphone terminal is received; or only adjusting in the frame structure a timing position at which the reply packet of the earphone terminal is received.

At the earphone terminal, correspondingly, the received radio packet adjustment information is used for deleting from the frame structure a retransmission packet requiring radio bandwidth no smaller than the radio bandwidth occupied by all reply packets of the second earphone terminal (i.e., the radio bandwidth necessary for the deleted retransmission packets is no smaller than the radio bandwidth occupied by all reply packets of the second earphone terminal); or deleting retransmission packets requiring radio bandwidth no smaller than the radio bandwidth occupied by all reply packets of the second earphone terminal and adjusting in the frame structure a timing position at which the reply packet is transmitted; or only adjusting in the frame structure a timing position at which the reply packet is transmitted.

Second Case

In this case, the earphone terminal status in the communication status indication information indicates the earphone terminal that is connected with the transmitting terminal, and it is known from the communication status indication information that there exists at least one first earphone terminal. The first earphone terminal satisfies the following conditions: the previous communication status indication information indicates that the first earphone terminal is successfully connected with the transmitting terminal and the current communication status indication information indicates that the first earphone terminal is disconnected from the transmitting terminal (i.e., there is an earphone terminal whose connection is lost and which is disconnected from the wireless communication system).

The aforesaid frame structure adjustment information comprises radio packet adjustment information. In this case, the generated radio packet adjustment information indicates deleting a reply packet corresponding to the first earphone terminal from the frame structure (i.e., the reply packet corresponding to the first earphone terminal is no longer comprised in the frame structure of the transmitting terminal). Here, the specific description will be made with reference to the scenario of FIG. 5. If FIG. 5 shows an example of the frame structure before the communication status changes, then FIG. 6 shows an example of the frame structure obtained through adjustment after connection of one earphone terminal is lost in the system (i.e., FIG. 6 shows an example of the frame structure after the communication status changes).

Figure 6:
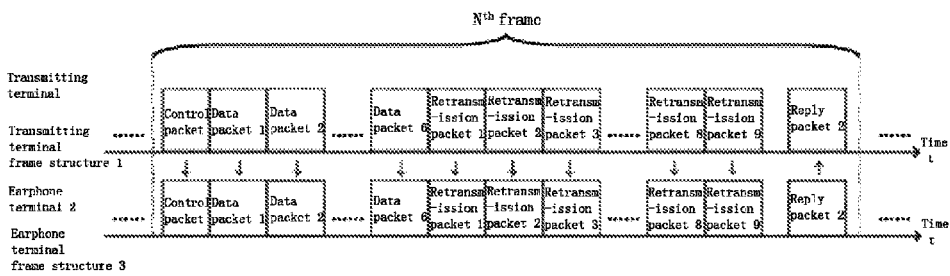
FIG. 6 is a schematic view of a frame structure according to the embodiment II of the present invention that is obtained through adjustment after connection between one earphone terminal and the transmitting terminal is lost in the scenario of FIG. 6.

FIG. 6 illustrates changes of the frame structure from the time when 2 earphone terminals are connected to the transmitting terminal to the time when one earphone terminal is lost. When two earphone terminals are connected to the transmitting terminal, the frame structure as shown in FIG. 5 is used. In this structure, the transmitting terminal frame structure used by the transmitting terminal may be referred to as the transmitting terminal frame structure 2, the earphone terminal frame structure used by the earphone terminal 1 may be referred to as the earphone terminal frame structure 1, and the earphone terminal frame structure used by the earphone terminal 2 may be referred to as the earphone terminal frame structure 2. After the earphone terminal 1 is disconnected (or the connection thereof is lost), the frame structure shown in FIG. 6 needs to be used. In this structure, the transmitting terminal frame structure used by the transmitting terminal may be referred to as the transmitting terminal frame structure 1, and the earphone terminal frame structure used by the earphone terminal 2 may be referred to as the earphone terminal frame structure 3.

As can be seen from the comparison between FIG. 5 and FIG. 6, after the earphone terminal 1 is lost, the number of the retransmission packets is increased in the frame structure of the transmitting terminal (the transmitting terminal frame structure 1), and the reply packet (the reply packet 1 shown in FIG. 5) of the lost earphone terminal 1 is no longer kept. Correspondingly, the number of the retransmission packets is increased in the frame structure of the earphone terminal 2 (the earphone terminal frame structure 1). Because deletion of the reply packet 1 has no influence on the timing position of the reply packet 2, it is mainly considered here whether the added retransmission packet 9 has an influence on the reply packet 2 in the earphone terminal 2. If the answer is "no", then there is no need to adjust the timing position of the reply packet 2 in the earphone terminal frame structure 2; and otherwise, if the answer is "yes", then it is needed to adjust the timing position of the reply packet 2 in the earphone terminal frame structure 2. The earphone terminal frame structure 3 is obtained by adjusting the timing position of the reply packet 2 to the position of the reply packet 1 in the earphone terminal frame structure 1 in the scenario of FIG. 6.

Here, the operation of increasing the number of the retransmission packets is not necessary, and the original number of the retransmission packets may be kept unchanged or the number of the retransmission packets may also be reduced to save the bandwidth of the system when it is detected that the current channel quality is desired. There is no problem if ensuring that the radio bandwidth necessary for the additionally provided retransmission packets is no larger than the radio bandwidth occupied by the deleted reply packets. The above description of FIG. 5 and FIG. 6 is mainly made by taking the scenario where the radio bandwidth occupied by the retransmission packets is the same as the radio bandwidth occupied by the reply packets as an example.

As described above, when the generated radio packet adjustment information indicates deleting a reply packet corresponding to the first earphone terminal from the frame structure, the aforesaid radio packet adjustment information may further indicate that the transmitting terminal additionally provides in the frame structure a retransmission packet requiring radio bandwidth no larger than radio bandwidth occupied by the deleted reply packet (i.e., the radio bandwidth necessary for the additionally provided retransmission packet is no larger than the radio bandwidth occupied by the deleted reply packet); or additionally provides in the frame structure a retransmission packet requiring radio bandwidth no larger than radio bandwidth occupied by the deleted reply packet and adjusts in the frame structure a timing position at which a reply packet of the earphone terminal is received; or only adjusts in the frame structure a timing position at which a reply packet of the earphone terminal is received.

Correspondingly, according to the received radio packet adjustment information, the earphone terminal additionally provides in the frame structure a retransmission packet requiring radio bandwidth no larger than radio bandwidth occupied by all reply packets of the first earphone terminal; or additionally provides in the frame structure a retransmission packet requiring radio bandwidth no larger than radio bandwidth occupied by all reply packets of the first earphone terminal and adjusts in the frame structure a timing position at which the reply packet is transmitted; or only adjusts in the frame structure a timing position at which the reply packet is transmitted.

For the approach of reserving bandwidth resources for the earphone terminal in advance in the prior art, the system reserves the corresponding bandwidth for the earphone terminal even if the earphone terminal is not connected and does not allow for data transmission, and this causes waste of the bandwidth resources and leads to a low utilization ratio of the bandwidth. To solve such a problem, further, the transmitting terminal releases the bandwidth resources reserved beforehand for the earphone terminal 1 after the earphone terminal 1 is lost and then reallocates the released bandwidth resources, thereby further increasing the utilization ratio of the resources of the system.

Third Case

In this case, the earphone terminal status in the communication status indication information indicates whether an earphone terminal has successfully received a corresponding data packet. The transmitting terminal acquires the communication status indication information according to the reply packet received from the earphone terminal. Because the reply packet describes the reception conditions of the radio packet in each frame period, the transmitting terminal can know from the reply packet whether the earphone terminal has successfully received the corresponding data packet.

In the third case, in each frame period, it is determined by the transmitting terminal according to a retransmission strategy that no retransmission packet is comprised in the frame structure and is transmitted to the earphone terminal. The retransmission strategy refers to a determination method used when the transmitting terminal determines according to reply packets of multiple earphone terminals the retransmission packet sequence and the number of the retransmission packets of the present frame that need to be transmitted.

For example, when it is known by the transmitting terminal from the communication status indication information that all data packets within a retransmission packet effective range of the corresponding frame have been successfully received, the frame structure indicated by the generated radio packet adjustment information comprises no retransmission packet adjustment information comprises no retransmission packet therein. The aforesaid corresponding frame is a reference frame selected as the adjustment basis in adjustment of the frame structure. If all the data packets within the retransmission packet effective range of the corresponding frame have been successfully received (i.e., deletion of the retransmission packet of the corresponding frame has no influence on reception of data), then it will be considered that the normal reception of the data can still be ensured even if no retransmission packet is comprised in the adjusted frame structure.

At this point, correspondingly, no retransmission packet is comprised in the frame structure adjusted by the earphone terminal according to the received radio packet adjustment information.

Further, this solution further provides a frame structure adjustment solution, which adjusts the retransmission packets (e.g., the retransmission packet sequence) according to the reception conditions of the retransmission packets in each frame period. This will be detailed as follows.

When it is known by the transmitting terminal that a data packet is lost within a retransmission packet effective range of the corresponding frame in each frame period, the transmitting terminal determines an adopted retransmission packet sequence according to the retransmission strategy, adjusts a position of a retransmission packet in the frame structure according to the retransmission packet sequence, and informs a corresponding earphone terminal of the retransmission packet sequence. For example, the transmitting terminal transmits the retransmission packet sequence carried by a control packet to the earphone terminal in order to carry out data communication with the earphone terminal according to the adjusted frame structure.

In this way, the transmitting terminal determines the retransmission packet sequence in the frame structure beforehand, and the retransmission packet sequence indicates positions of data packets corresponding to different retransmission packets.

Correspondingly, at the earphone terminal, the retransmitted data packets are received in the retransmission packet sequence, which is obtained from the transmitting terminal, according to the received radio packet adjustment information.

In this treatment way, after the retransmission packet sequence needing to be retransmitted is determined by the transmitting terminal, the transmitting terminal can broadcast retransmission packet sequence information to all the earphone terminals in the system through a control packet (or a data packet). If an earphone terminal finds that the retransmission packet sequence of the frame currently received does not comprise a retransmission packet necessary for the earphone terminal per se upon receiving the control packet, then the earphone terminal will terminate receiving of the retransmission packets ahead of time to reduce the power consumption of the system.

As described above, in the third case, the scenario where no retransmission packet is transmitted to the earphone terminal and the scenario where the adopted retransmission packet sequence is determined beforehand according to the retransmission strategy can proceed in each frame period. Then, in each frame period, the transmitting terminal adjusts the adopted frame structure according to the frame structure adjustment information, and transmits a radio packet to the earphone terminal and receives a reply packet from the earphone terminal according to the adjusted frame structure.

Correspondingly, the earphone terminal adjusts the adopted frame structure according to the frame structure adjustment information consistent with the transmitting terminal, and receives a radio packet from the transmitting terminal and transmits a reply packet to the transmitting terminal according to the adjusted frame structure.

In this case, the frame structure can be adjusted according to the frame structure adjustment information once the frame structure adjustment information is generated, without the need of waiting for a frame structure change point, thereby achieving the effect of adjusting the frame structure in real time.

It shall be understood that, this solution does not exclude the way of adjusting the frame structure after the frame structure change point comes in the third case.

Fourth Case

In this case, it is known from the communication status indication information that the current channel quality is improved or degraded as compared to the previous channel quality. The transmitting terminal may acquire the communication status indication information by detecting the channel status.

Here, both the current channel quality and the previous channel quality are statistic results obtained through measurement of the channel quality in multiple frame periods within a certain range.

The term "current" refers to a frame period range within which the channel detection is performed to generate communication status indication information for use in adjusting the frame structure this time, the frame period range usually consists of multiple frame periods, and the current channel quality is a result obtained through statistics made according to the channel quality within the current frame period range.

The frame structure change point or the frame structure change period is set in this solution, the frame structure adjustment information is generated before the frame structure change period, and both the transmitting terminal and the earphone terminal adopt at the same time a new frame structure for communication when the frame structure change period comes. The transmitting terminal may broadcast the frame structure adjustment information to the earphone terminals existing in the system in all the frame periods after the frame structure adjustment information is generated and before the frame structure change period comes. Through the setting of the frame structure change period, it is ensured that both the transmitting terminal and the earphone terminal can be informed of the frame structure adjustment information before adjustment of the frame structure, thereby ensuring successful accomplishment of the adjustment operation.

The aforesaid frame structure adjustment information comprises relative position adjustment information, which indicates a timing position of a period in which a frame structure change is performed relative to a period in which the corresponding frame structure adjustment information is transmitted. When the channel quality indicated by the first communication status indication information is higher than the channel quality indicated by the second communication status indication information, a value of the timing position indicated by the relative position adjustment information generated according to the first communication status indication information is smaller than a value of the timing position indicated by the relative position adjustment information generated according to the second communication status indication information.

34: Transmitting the frame structure adjustment information to a corresponding earphone terminal.

The transmitting terminal may carry the frame structure adjustment information in a data packet and transmit the data packet to the earphone terminal, or generate a control packet according to the frame structure adjustment information (e.g., pack the frame structure adjustment information alone into one control packet) and transmit the control packet to the earphone terminal.

Correspondingly, the earphone terminal receives the frame structure adjustment information transmitted by means of the data packet by the transmitting terminal, with the frame structure adjustment information being carried by the data packet; or, the earphone terminal receives the frame structure adjustment information transmitted by means of the control packet by the transmitting terminal, with the control packet being generated according to the frame structure adjustment information.

35: Adjusting an adopted frame structure and performing data communication according to the adjusted frame structure.

After the frame structure change period comes, both the transmitting terminal and the earphone terminal adjust the adopted frame structure according to the obtained frame structure adjustment information; and when the period in which the frame structure change is performed comes, the transmitting terminal transmits a radio packet to the earphone terminal and receives a reply packet from the earphone terminal according to the adjusted frame structure.

Further, before adjusting the adopted frame structure according to the frame structure adjustment information (i.e., at a transition stage for waiting for the frame structure change period), this method further comprises:

prohibiting receiving a reply packet at a position that corresponds to the first earphone terminal in the reply packet of the frame structure currently used. Because the transmitting terminal has the radio packet receiving function activated and is in a receiving status and thus requires certain power consumption, the power consumption is further reduced through the prohibiting receiving function.

Figure 7:
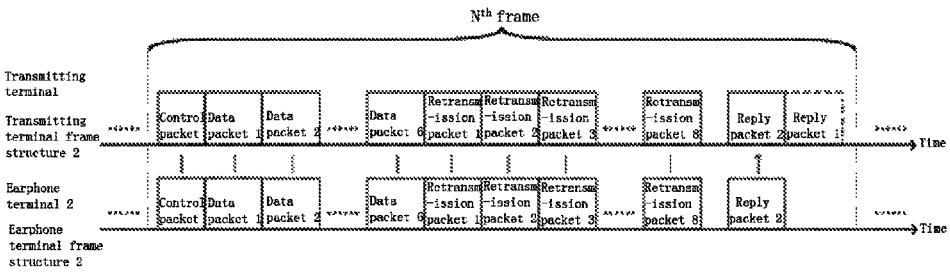
FIG. 7 is a schematic view of a frame structure adopted at a transition stage according to the embodiment II of the present invention.

Referring to FIG. 7, there is shown a schematic view of a frame structure adopted at the transition stage. The transmitting terminal gets that the earphone terminal 1 is lost, and starts broadcasting the frame structure used at the transition stage of frame adjustment. In the frame structure, the transmitting terminal is prohibited from receiving a reply packet at a position of the reply packet (the reply packet 1) of the earphone terminal 1 so as to reduce the power consumption.

Figure 8:
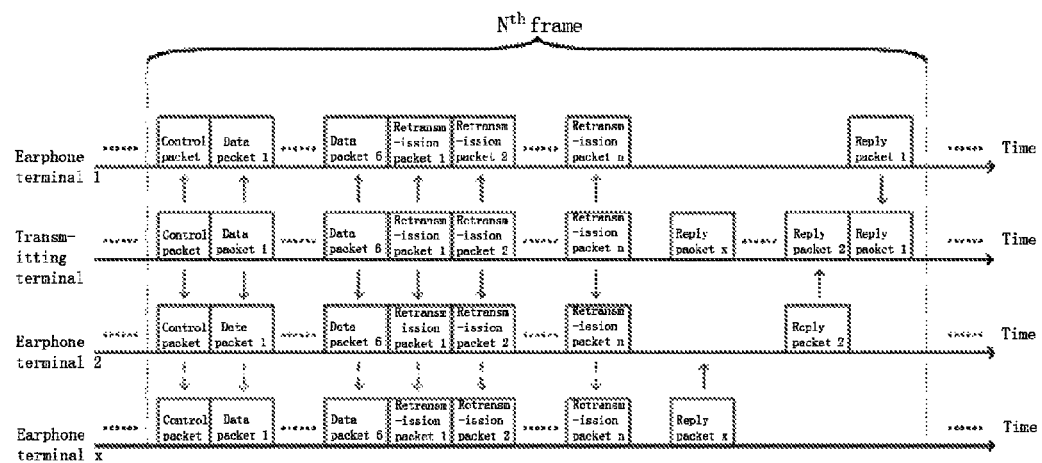
FIG. 8 is a schematic view of a frame structure according to the embodiment II of the present invention when the transmitting terminal is connected to multiple earphone terminals.

The above description is made by taking only one transmitting terminal and one earphone terminal or one transmitting terminal and two earphone terminals as an example. However, this solution is not limited thereto; and instead, this solution can flexibly apply to a scenario where multiple earphone terminals are comprised. Referring to FIG. 8, there is shown a schematic view of a frame structure when the transmitting terminal is connected to multiple earphone terminals. When the transmitting terminal is connected to x earphone terminals, the frame structure of the system consists of 1 control packet, 6 data packets, n retransmission packets and x reply packets, wherein the x reply packets correspond to the x earphone terminals. For example, the reply packet 1 corresponds to the earphone terminal 1, the reply packet 2 corresponds to the earphone terminal 2, and the reply packet x corresponds to the earphone terminal x. Here, the maximum value of x is the maximum number of the earphone terminals that can be supported by the system, and x is jointly determined by such factors as the radio bandwidth, the length of the frame period, and the size of the radio packet.

Further, this solution further sets a mechanism of actively terminating reception of the retransmission packets for the earphone terminals, which comprises the following processes:

when a retransmission packet from the transmitting terminal exists in the current frame, if it is determined that no data packet is lost within the retransmission range of the current frame according to statistics made according to the received radio packet, then rejecting receiving the retransmission packet from the transmitting terminal (i.e., all the data packets have been successfully received and there is no need to receive retransmission packets) to reduce the power consumption; or after at least one retransmission packet of the current frame is received, if it is determined that no data packet is lost within the retransmission range of the current frame, then rejecting continuing receiving the retransmission packet from the transmitting terminal (i.e., all the data packets within the effective range of the retransmission packets in the current frame period have been successfully received through the retransmission packet that has been received currently, and the operation of receiving the retransmission packets is terminated ahead of time) to reduce the power consumption.

The retransmission strategy adopted in this solution is on the basis that the reply packet is returned to the transmitting terminal and describes the reception conditions of the radio packet, so the proper transmission of the reply packet must be ensured as much as possible in order to ensure optimal use of the retransmission strategy.

Figure 9:
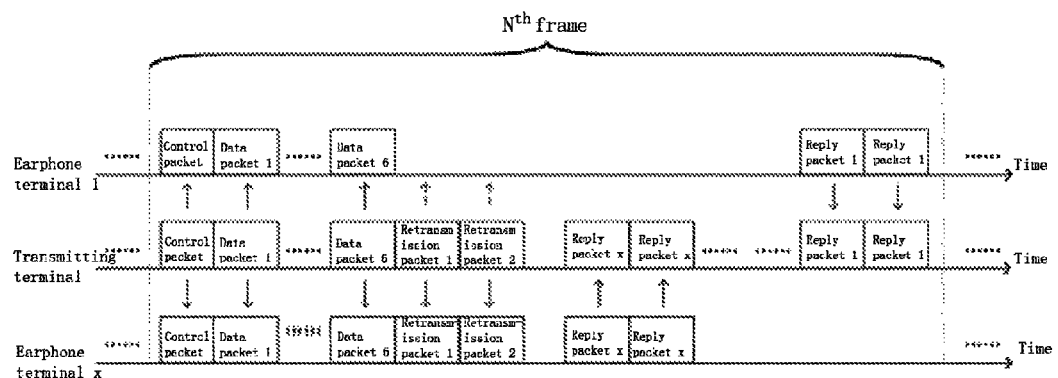
FIG. 9 is a schematic view of a frame structure according to the embodiment II of the present invention when a reply packet is retransmitted for multiples times.
Figure 10:
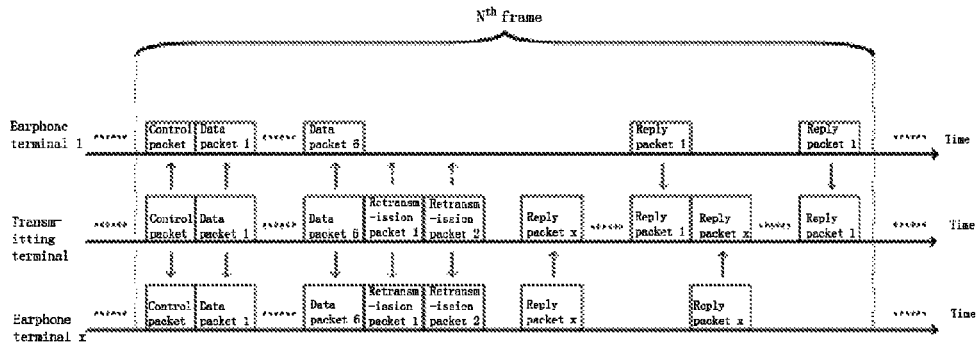
FIG. 10 is a schematic view of another frame structure according to the embodiment II of the present invention when a reply packet is retransmitted for multiples times.

To achieve such an effect, this solution further provides a frame structure of another form. Referring to FIG. 9 and FIG. 10, a frame structure for retransmitting a reply packet for multiples times is adopted. In this frame structure, the earphone terminal returns at least two reply packets to the transmitting terminal for the radio packets of each frame received from the transmitting terminal. The number of times or the number of the reply packets used is determined according to such system factors as the radio bandwidth and the power consumption of the system. For clarity of description, FIG. 9 and FIG. 10 show a frame structure for retransmitting a reply packet twice used after the system has multiple earphone terminals connected. As compared to the frame structure in FIG. 9, retransmissions of the reply packets are interleaved in time (i.e., the timing positions of the reply packets are adjusted) in the frame structure of FIG. 10 to prevent instantaneous burst interference from causing loss of all the reply packets of a same earphone terminal, thereby ensuring that the reply packets can be successfully transmitted to the transmitting terminal.

As can be seen from the above description, the technical solution according to this embodiment of the present invention provides a new wireless digital audio communication solution, which makes a corresponding adjustment strategy according to the acquired actual communication status of the system, and makes the earphone terminal and the transmitting terminal informed of the adjustment strategy through the generated frame structure adjustment information. Thereby, a wireless communication manner of dynamically changing the adopted frame structure according to the communication status is achieved. This significantly increases the flexibility of the wireless audio transmission system, ensures successful accomplishment of audio communication in various communication scenarios, and improves the user's experience.

Further, by dynamically adjusting the frame structure, this solution can flexibly set the specific contents of a radio packet needing to be transmitted, thus controlling resources of the system that need to be occupied. This can reduce the power consumption of the system to the maximum extent and increase the utilization ratio of the resources of the system while meeting the requirements of high reliability, low latency and low radiation. Thereby, this solution is relatively more practical and has wide prospect of applications.

Figure 11:
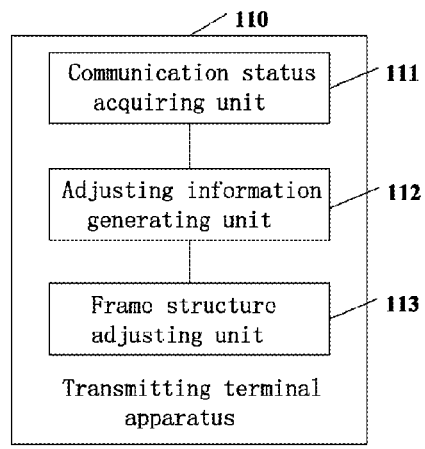
FIG. 11 is a schematic structural view of a transmitting terminal apparatus according to an embodiment III of the present invention.

An embodiment III of the present invention further provides a transmitting terminal apparatus 110 in a wireless digital communication. Referring to FIG. 11, the apparatus comprises:

a communication status acquiring unit 111, being configured to acquire communication status indication information which indicates a receiving terminal status and/or a channel status;

an adjustment information generating unit 112, being configured to generate frame structure adjustment information when knowing from the communication status indication information that a communication status has changed, and transmit the frame structure adjustment information to a corresponding receiving terminal, wherein the frame structure adjustment information comprises radio packet adjustment information; and a frame structure adjusting unit 113, being configured to adjust an adopted frame structure according to the frame structure adjustment information and perform data communication with the receiving terminal apparatus according to the adjusted frame structure.

Further, depending on different contents of the communication status indication information, the way of acquiring the information is different. For example, when the receiving terminal status indicates the receiving terminal that has been connected with the transmitting terminal, the communication status acquiring unit 111 is configured to acquire and record the communication status indication information (i.e., acquire the receiving terminal status of the receiving terminal that has been connected) by detecting the connection status of the receiving terminal.

The aforesaid adjustment information generating unit 112 is configured for that, when the previous communication status indication information indicates that at least one first receiving terminal has been connected and the current communication status indication information indicates that the first receiving terminal is disconnected, the generated radio packet adjustment information indicates deleting a reply packet corresponding to the first receiving terminal from the frame structure; or the aforesaid adjustment information generating unit 112 is configured for that, when the previous communication status indication information indicates that at least one second receiving terminal is not connected and the current communication status indication information indicates that the second receiving terminal is successfully connected, the generated radio packet adjustment information indicates adding a reply packet corresponding to the second receiving terminal into the frame structure.

When the generated radio packet adjustment information indicates deleting a reply packet corresponding to the first receiving terminal from the frame structure, the radio packet adjustment information generated by the adjustment information generating unit 112 further indicates additionally providing in the frame structure a retransmission packet requiring radio bandwidth no larger than radio bandwidth occupied by the deleted reply packet and/or adjusting timing positions in the frame structure at which multiple reply packets are received.

When the generated radio packet adjustment information indicates adding a reply packet corresponding to the second receiving terminal into the frame structure, the radio packet adjustment information generated by the adjustment information generating unit 112 further indicates deleting from the frame structure a retransmission packet requiring radio bandwidth no smaller than a radio bandwidth occupied by the added reply packet, and/or adjusting in the frame structure a timing position of a reply packet that needs to be received.

When knowing from the communication status indication information that there exists at least one first receiving terminal (i.e., when the generated radio packet adjustment information indicates deleting a reply packet corresponding to the first receiving terminal from the frame structure), the transmitting terminal apparatus 110 further comprises a transition stage control unit and a bandwidth resource releasing unit.

The transition stage control unit is configured to prohibit receiving a reply packet at a position that corresponds to the first receiving terminal in the reply packet of the frame structure currently used before the adopted frame structure is adjusted according to the frame structure adjustment information.

The bandwidth resource releasing unit is configured to release bandwidth resources allocated to the first receiving terminal while or after the adopted frame structure is adjusted according to the frame structure adjustment information.

If the receiving terminal status indicates whether the receiving terminal has successfully received a corresponding data packet, then the communication status acquiring unit 111 is configured to acquire the communication status indication information (i.e., acquire the receiving terminal status indicating whether the receiving terminal has successfully received a corresponding data packet) according to a reply packet received from the receiving terminal.

The aforesaid adjustment information generating unit 112 is configured for that, in each frame period, when knowing from the communication status indication information that all data packets within the effective range of the retransmission function of the corresponding frame have been successfully received, the frame structure indicated by the generated radio packet adjustment information comprises no retransmission packet. Or, when knowing from the communication status indication information that a data packet is lost within the effective range of the retransmission function of the corresponding frame in each frame period, the adjustment information generating unit 112 is configured to determine an adopted retransmission packet sequence according to a retransmission strategy, and the generated radio packet adjustment information indicates a position of the data packet that corresponds to the retransmission packet in the frame structure. At this point, the operations of the adjustment information generating unit 112 can be understood by referring to the description of the aforesaid third case. Correspondingly, at this point, the frame structure adjusting unit 113 is configured to, in each frame period, adjust the adopted frame structure according to the frame structure adjustment information, and transmit a radio packet to the receiving terminal and receive a reply packet from the receiving terminal according to the adjusted frame structure.

If the aforesaid channel status indicates the current channel quality of the communication system, the communication status acquiring unit 111 is configured to acquire the communication status indication information (i.e., acquire the channel status indicating the current channel quality of the communication system) by detecting the channel status.

Then, the frame structure adjustment information further comprises relative position adjustment information, which indicates a timing position of a period in which a frame structure change is performed relative to a period in which the corresponding frame structure adjustment information is transmitted. The aforesaid adjustment information generating unit 112 is configured for that, when the channel quality indicated by the first communication status indication information is higher than the channel quality indicated by the second communication status indication information, a value of the timing position indicated by the relative position adjustment information generated according to the first communication status indication information is smaller than a value of the timing position indicated by the relative position adjustment information generated according to the second communication status indication information.

Further, the frame structure change point or the frame structure change period is set in this solution, the frame structure adjustment information is generated before the frame structure change period, and both the transmitting terminal and the receiving terminal at the same time adopt a new frame structure for communication when the frame structure change period comes. The transmitting terminal may broadcast the frame structure adjustment information to the receiving terminals existing in the system in all the frame periods after the frame structure adjustment information is generated and before the frame structure change period comes. Through the setting of the frame structure change period, it is ensured that both the transmitting terminal and the receiving terminal can know the frame structure adjustment information before adjustment of the frame structure, thereby ensuring successful accomplishment of the adjustment operation.

Then, the frame structure adjusting unit 113 is configured to adjust the adopted frame structure according to the frame structure adjustment information, and transmit a radio packet to the receiving terminal and receive a reply packet from the receiving terminal according to the adjusted frame structure when the period in which the frame structure change is performed comes.

Further, the adjustment information generating unit 112 is configured to carry the frame structure adjustment information in a data packet and transmit the data packet to the receiving terminal apparatus, or generate a control packet according to the frame structure adjustment information and transmit the control packet to the receiving terminal apparatus.

The aforesaid receiving terminal may be a terminal apparatus (e.g., an earphone terminal) corresponding to the aforesaid transmitting terminal apparatus.

The operations of the apparatuses and the units according to the device embodiment of the present invention can be understood by referring to the method embodiment of the present invention.

As can be seen from the above description, the technical solution according to this embodiment of the present invention provides a new wireless digital audio communication solution, which makes a corresponding adjustment strategy according to the acquired actual communication status of the system, and makes the receiving terminal and the transmitting terminal informed of the adjustment strategy through the generated frame structure adjustment information. Thereby, a wireless communication manner of dynamically changing the adopted frame structure according to the communication status is achieved. This significantly increases the flexibility of the wireless audio transmission system, ensures successful accomplishment of audio communication in various communication scenarios, and improves the user's experience.

Further, by dynamically adjusting the frame structure, this solution can flexibly set the specific contents of a radio packet needing to be transmitted, thus controlling resources of the system that need to be occupied. This can reduce the power consumption of the system to the maximum extent and increase the utilization ratio of the resources of the system while meeting the requirements of high reliability, low latency and low radiation. Thereby, this solution is relatively more practical and has wide prospect of applications.

Figure 12:
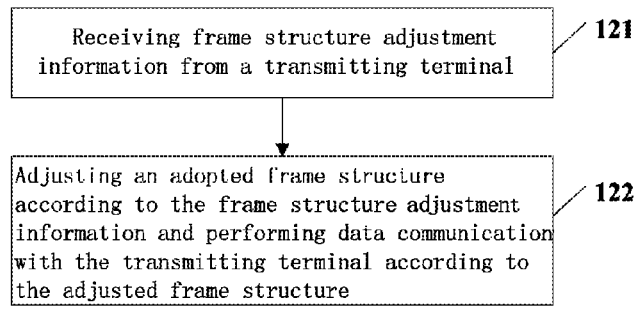
FIG. 12 is a schematic view of a wireless digital communication method according to an embodiment IV of the present invention.

An embodiment IV of the present invention further provides a wireless digital communication method. Referring to FIG. 12, the method comprises:

121: receiving frame structure adjustment information from a transmitting terminal, wherein the frame structure adjustment information comprises radio packet adjustment information, the frame structure adjustment information is generated by the transmitting terminal according to communication status indication information when it is known by the transmitting terminal that a communication status has changed, and the communication status indication information indicates a receiving terminal status and/or a channel status; and 122: adjusting an adopted frame structure according to the frame structure adjustment information and performing data communication with the transmitting terminal according to the adjusted frame structure.

The step 121 and the step 122 can be accomplished by an apparatus at a terminal side (e.g., an earphone terminal apparatus).

Further, the aforesaid receiving terminal status may indicate the receiving terminal that has been connected with the transmitting terminal. For example, in the scenario of the wireless digital earphone communication, the aforesaid receiving terminal status is an earphone terminal status which indicates the earphone terminal connected with the transmitting terminal; or the aforesaid receiving terminal status may also indicate whether the receiving terminal has successfully received a corresponding data packet. The aforesaid channel status indicates the current channel quality of the communication system.

Further, in a same period, the frame structure adjustment information adopted by the transmitting terminal and the receiving terminal during adjustment of the frame structure shall keep consistent in order to ensure that the transmitting terminal and the receiving terminal adopt the same frame structure for communication in the radio packet transmission of the same period.

It shall be understood that, in some scenarios of non-real time transmission, the transmitting terminal and the receiving terminal can adopt different frame structures for communication in the radio packet transmission of the same period, and the frame structure adjustment information adopted by the transmitting terminal and the receiving terminal during adjustment of the frame structures may also be different in the same period.

Figure 13:
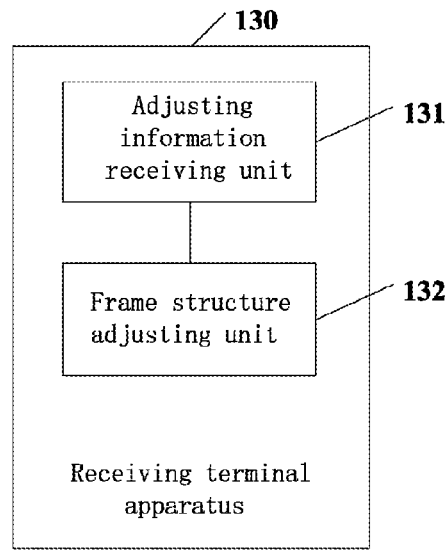
FIG. 13 is a schematic structural view of a receiving terminal apparatus according to an embodiment V of the present invention.

An embodiment V of the present invention further provides a receiving terminal apparatus in wireless digital communication. Referring to FIG. 13, the receiving terminal apparatus 130 comprises:

an adjustment information receiving unit 131, being configured to receive frame structure adjustment information from a transmitting terminal, wherein the frame structure adjustment information comprises radio packet adjustment information, the frame structure adjustment information is generated by the transmitting terminal according to communication status indication information when it is known by the transmitting terminal that a communication status has changed, and the communication status indication information indicates a receiving terminal status and/or a channel status; and a frame structure adjusting unit 132, being configured to adjust the adopted frame structure according to the frame structure adjustment information and perform data communication with the transmitting terminal apparatus according to the adjusted frame structure.

Depending on different actual network structures, the receiving terminal apparatus 130 may be achieved by different devices. In a wireless communication earphone system, the receiving terminal apparatus may be an earphone terminal. The aforesaid receiving terminal status may indicate the receiving terminal that has been connected with the transmitting terminal. For example, in the scenario of the wireless digital earphone communication, the aforesaid receiving terminal status is an earphone terminal status which indicates the earphone terminal connected with the transmitting terminal; or the aforesaid receiving terminal status may also indicate whether the receiving terminal has successfully received a corresponding data packet. The aforesaid channel status indicates the current channel quality of the communication system.

When the generated radio packet adjustment information indicates deleting a reply packet corresponding to the first earphone terminal from the frame structure, the generated radio packet adjustment information further indicates additionally providing in the frame structure a retransmission packet requiring radio bandwidth no larger than radio bandwidth occupied by the deleted reply packet and/or adjusting timing positions in the frame structure at which multiple reply packets are received. Then, the frame structure adjusting unit 132 is configured to additionally provide in the frame structure a retransmission packet requiring radio bandwidth no larger than radio bandwidth occupied by all reply packets of the first earphone terminal according to the received radio packet adjustment information, and/or adjust in the frame structure a timing position at which the reply packet is transmitted.

When the generated radio packet adjustment information indicates adding a reply packet corresponding to the second earphone terminal into the frame structure, the generated radio packet adjustment information further indicates deleting from the frame structure a retransmission packet requiring radio bandwidth no smaller than radio bandwidth occupied by the added reply packet and/or adjusting in the frame structure a timing position of a reply packet that needs to be received. Then, the frame structure adjusting unit 132 is configured to delete from the frame structure a retransmission packet requiring radio bandwidth no smaller than radio bandwidth occupied by all reply packets of the second earphone terminal according to the received radio packet adjustment information, and/or adjust in the frame structure a timing position at which the reply packet is transmitted.

If the earphone terminal status indicates whether the earphone terminal has successfully received a corresponding data packet, then when it is known from the communication status indication information that all data packets within the effective range of the retransmission function of the corresponding frame have been successfully received in each frame period, the frame structure indicated by the generated radio packet adjustment information comprises no retransmission packet; or when it is known from the communication status indication information that a data packet is lost within the effective range of the retransmission function of the corresponding frame in each frame period, an adopted retransmission packet sequence is determined according to a retransmission strategy, and the generated radio packet adjustment information indicates a position of the data packet that corresponds to the retransmission packet in the frame structure. At this point, the frame structure adjusting unit 132 is configured to, in each frame period, adjust the adopted frame structure according to the frame structure adjustment information consistent with the transmitting terminal, and receive a radio packet from the transmitting terminal and transmit a reply packet to the transmitting terminal according to the adjusted frame structure. At this point, the receiving terminal apparatus 130 may further, by means of a third receiving control unit, terminate receiving of the retransmission packets ahead of time or have no need to receive the retransmission packets so as to reduce the power consumption.

If the aforesaid channel status indicates the current channel quality of the communication system, then the frame structure adjustment information further comprises relative position adjustment information, which indicates a timing position of a period in which a frame structure change is performed relative to a period in which the corresponding frame structure adjustment information is transmitted.

The frame structure change point or the frame structure change period is set in this solution, the frame structure adjustment information is generated before the frame structure change period, and both the transmitting terminal and the earphone terminal at the same time adopt a new frame structure for communication when the frame structure change period comes. The transmitting terminal may broadcast the frame structure adjustment information to the earphone terminals existing in the system, in all the frame periods after the frame structure adjustment information is generated and before the frame structure change period comes. Through the setting of the frame structure change period, it is ensured that both the transmitting terminal and the earphone terminal can know the frame structure adjustment information before adjustment of the frame structure, thereby ensuring successful accomplishment of the adjustment operation.

Then, the frame structure adjusting unit 132 is configured to adjust the adopted frame structure according to the frame structure adjustment information consistent with the transmitting terminal, and receive a radio packet from the transmitting terminal and transmit a reply packet to the transmitting terminal according to the adjusted frame structure when the period in which the frame structure change is performed and which is consistent with the transmitting terminal comes.

Further, the transmitting terminal carries the frame structure adjustment information in a data packet and transmits the data packet to the earphone terminal apparatus, or generates a control packet according to the frame structure adjustment information and transmits the control packet to the receiving terminal apparatus.

At this point, correspondingly, the adjustment information receiving unit 131 is configured to receive the frame structure adjustment information transmitted by means of the data packet or the control packet by the transmitting terminal.

Further, the receiving terminal may terminate receiving of the retransmission packets ahead of time actively or according to the information from the transmitting terminal or have no need to receive the retransmission packets so as to reduce the power consumption. In this case, the receiving terminal apparatus further comprises:

a first receiving control unit, being configured to, when a retransmission packet from the transmitting terminal exists in the current frame, if determining that no data packet is lost within the retransmission range of the current frame according to statistics made according to the received radio packet, reject receiving the retransmission packet from the transmitting terminal; and/or a second receiving control unit, being configured to, after at least one retransmission packet of the current frame is received, if determining that no data packet is lost within the retransmission range of the current frame, reject continuing receiving the retransmission packets from the transmitting terminal; and/or a third receiving control unit, being configured to, when determining that the coming retransmission packets in the current frame do not comprise a required retransmission packet according to the known retransmission packet sequence adopted by the transmitting terminal, reject receiving the retransmission packet from the transmitting terminal. Here, there are two cases where the coming retransmission packets exist: in one case, no retransmission packet from the transmitting terminal is received; and in the other case, a part of the retransmission packets from the transmitting terminal are received while the remaining part of the retransmission packets are not received.

Further, this solution further provides a frame structure of another form. Referring to FIG. 9 and FIG. 10, a frame structure for retransmitting a reply packet for multiples times is adopted. In this frame structure, the receiving terminal returns at least two identical reply packets to the transmitting terminal for the radio packets of each frame received from the transmitting terminal. Moreover, when there are multiple receiving terminals, the reply packet of each of the receiving terminals is retransmitted to the transmitting terminal for multiple times according to the timing positions, with two adjacent reply packets at the timing positions belonging to different earphone terminals (i.e., the reply packets of different receiving terminals being alternately arranged). In this case, the frame structure adjusting unit 132 is further configured to return at least two reply packets to the transmitting terminal for the radio packets of each frame received from the transmitting terminal.

The operations of the apparatuses and the units according to the apparatus embodiment of the present invention can be understood by referring to the method embodiment of the present invention.

Figure 14:
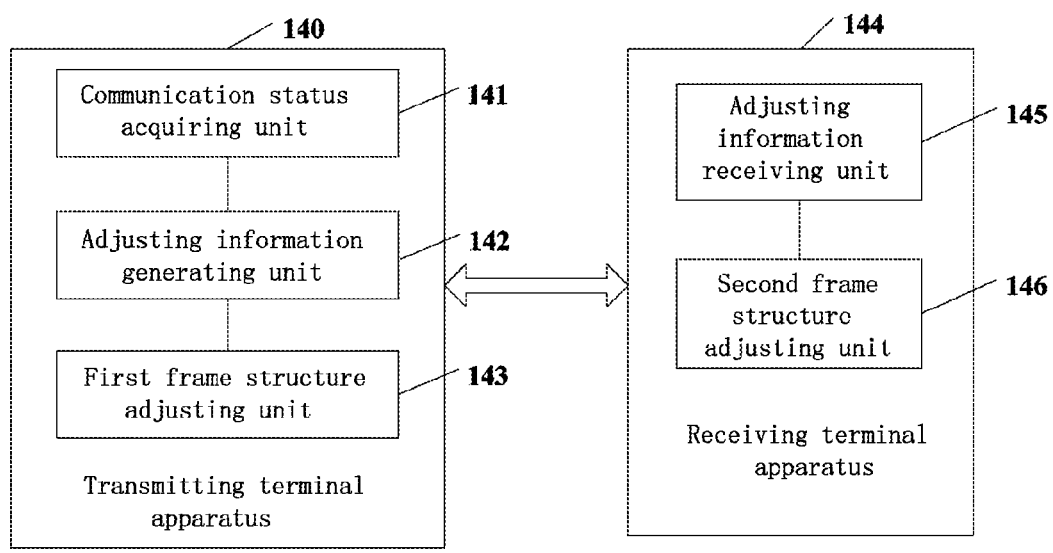
FIG. 14 is a schematic view of a wireless digital communication system according to an embodiment VI of the present invention.

An embodiment VI of the present invention provides a wireless digital communication system. Referring to FIG. 14, the system comprises a transmitting terminal apparatus 140 and a receiving terminal apparatus 144.

The transmitting terminal apparatus 140 comprises:

a communication status acquiring unit 141, being configured to acquire communication status indication information which indicates a receiving terminal status and/or a channel status;

an adjustment information generating unit 142, being configured to generate frame structure adjustment information when knowing from the communication status indication information that a communication status has changed, and transmit the frame structure adjustment information to a corresponding receiving terminal, wherein the frame structure adjustment information comprises radio packet adjustment information; and a first frame structure adjusting unit 143, being configured to adjust an adopted frame structure according to the frame structure adjustment information and perform data communication with the receiving terminal according to the adjusted frame structure.

The receiving terminal apparatus 144 comprises:

an adjustment information receiving unit 145, being configured to receive the frame structure adjustment information generated by the adjustment information generating unit from a transmitting terminal, wherein the frame structure adjustment information comprises radio packet adjustment information; and a second frame structure adjusting unit 146, being configured to adjust the adopted frame structure according to the frame structure adjustment information and perform data communication with the transmitting terminal according to the adjusted frame structure.

The receiving terminal may be a terminal apparatus (e.g., an earphone terminal in wireless digital earphone communication) corresponding to the transmitting terminal apparatus. In this case, the aforesaid receiving terminal status is an earphone terminal status which may indicate the earphone terminal that has been connected (i.e., the earphone terminal that has been connected with the transmitting terminal); or the aforesaid earphone terminal status may also indicate whether the earphone terminal has successfully received a corresponding data packet. The aforesaid channel status indicates the current channel quality of the communication system.

Further, in a same period, the frame structure adjustment information adopted by the transmitting terminal and the earphone terminal during adjustment of the frame structure shall keep consistent in order to ensure that the transmitting terminal and the earphone terminal adopt the same frame structure for communication in the radio packet transmission of the same period.

It shall be understood that, in some scenarios suitable for non-real time transmission, the transmitting terminal and the earphone terminal can adopt different frame structures for communication in the radio packet transmission of the same period, and the frame structure adjustment information adopted by the transmitting terminal and the earphone terminal during adjustment of the frame structures may also be different in the same period.

Further, the communication status acquiring unit 141 is configured to acquire the receiving terminal status of the receiving terminal that has been connected by detecting a connection status of the receiving terminal;

The adjustment information generating unit 142 is configured for that, when the previous communication status indication information indicates that at least one first receiving terminal has been connected and the current communication status indication information indicates that the first receiving terminal is disconnected, the generated radio packet adjustment information indicates deleting a reply packet corresponding to the first receiving terminal from the frame structure;

or, the adjustment information generating unit 142 is configured for that, when the previous communication status indication information indicates that at least one second receiving terminal is not connected and the current communication status indication information indicates that the second receiving terminal is successfully connected, the generated radio packet adjustment information indicates adding a reply packet corresponding to the second receiving terminal into the frame structure.

Further, when the generated radio packet adjustment information indicates deleting a reply packet corresponding to the first receiving terminal from the frame structure, the radio packet adjustment information generated by the adjustment information generating unit 142 further indicates additionally providing in the frame structure a retransmission packet requiring radio bandwidth no larger than radio bandwidth occupied by the deleted reply packet and/or adjusting in the frame structure a timing position of a reply packet that needs to be received; and the second frame structure adjusting unit 146 is configured to additionally provide in the frame structure a retransmission packet requiring radio bandwidth no larger than radio bandwidth occupied by all reply packets of the first receiving terminal according to the received radio packet adjustment information, and/or adjust in the frame structure a timing position at which the reply packet is transmitted;

or, when the generated radio packet adjustment information indicates adding a reply packet corresponding to the second receiving terminal into the frame structure, the radio packet adjustment information generated by the adjustment information generating unit 142 further indicates deleting from the frame structure a retransmission packet requiring radio bandwidth no smaller than radio bandwidth occupied by the added reply packet and/or adjusting in the frame structure a timing position of a reply packet that needs to be received; and the second frame structure adjusting unit 146 is configured to delete from the frame structure a retransmission packet requiring radio bandwidth no smaller than radio bandwidth occupied by all reply packets of the second receiving terminal according to the received radio packet adjustment information, and/or adjust in the frame structure a timing position at which the reply packet is transmitted.

Further, when the generated radio packet adjustment information indicates deleting a reply packet corresponding to the first receiving terminal from the frame structure, the transmitting terminal apparatus 140 further comprises a transition stage control unit and a bandwidth resource releasing unit, the transition stage control unit is configured to prohibit receiving a reply packet at a position that corresponds to the first receiving terminal in the reply packets of the frame structure currently used before the adopted frame structure is adjusted according to the frame structure adjustment information; and the bandwidth resource releasing unit is configured to release bandwidth resources allocated to the first receiving terminal while or after the adopted frame structure is adjusted according to the frame structure adjustment information.

Further, the communication status acquiring unit 141 is configured to acquire the receiving terminal status indicating whether the receiving terminal has successfully received a corresponding data packet according to a reply packet received from the receiving terminal;

the adjustment information generating unit 142 is configured for that, in each frame period, when knowing from the communication status indication information that all data packets within the effective range of the retransmission function of the corresponding frame have been successfully received, the generated radio packet adjustment information indicates that the frame structure comprises no retransmission packet; or the adjustment information generating unit 142 is configured to, when knowing from the communication status indication information that a data packet is lost within the effective range of the retransmission function of the corresponding frame in each frame period, determine an adopted retransmission packet sequence according to a retransmission strategy, wherein the generated radio packet adjustment information indicates a position of the data packet that corresponds to the retransmission packet in the frame structure.

Further, the first frame structure adjusting unit 143 is configured to, in each frame period, adjust the adopted frame structure according to the frame structure adjustment information, and transmit a radio packet to the receiving terminal and receive a reply packet from the receiving terminal according to the adjusted frame structure; and the second frame structure adjusting unit 146 is configured to, in each frame period, adjust the adopted frame structure according to the frame structure adjustment information consistent with the transmitting terminal, and receive a radio packet from the transmitting terminal and transmit a reply packet to the transmitting terminal according to the adjusted frame structure.

Further, the communication status acquiring unit 141 is configured to acquire a channel status of the current channel quality of the communication system by detecting the channel status;

the frame structure adjustment information further comprises relative position adjustment information, which indicates a timing position of a period in which a frame structure change is performed relative to a period in which the corresponding frame structure adjustment information is transmitted, and the adjustment information generating unit 142 is further configured to, when the channel quality indicated by the first communication status indication information is higher than the channel quality indicated by the second communication status indication information, a value of the timing position indicated by the relative position adjustment information generated according to the first communication status indication information is smaller than a value of the timing position indicated by the relative position adjustment information generated according to the second communication status indication information.

Further, the first frame structure adjusting unit 143 is configured to adjust the adopted frame structure according to the frame structure adjustment information, and transmit a radio packet to the receiving terminal and receive a reply packet from the receiving terminal according to the adjusted frame structure when the period in which the frame structure change is performed comes; and the second frame structure adjusting unit 146 is configured to adjust the adopted frame structure according to the frame structure adjustment information consistent with the transmitting terminal, and receive a radio packet from the transmitting terminal and transmit a reply packet to the transmitting terminal according to the adjusted frame structure when the period in which the frame structure change is performed and which is consistent with the transmitting terminal comes.

Further, the adjustment information generating unit 142 further comprises a transmitting module, which is configured to carry the frame structure adjustment information in a data packet and transmit the data packet to the receiving terminal apparatus, or generate a control packet according to the frame structure adjustment information and transmit the control packet to the receiving terminal apparatus; and the adjustment information receiving unit 145 is configured to receive the frame structure adjustment information transmitted by means of the data packet or the control packet by the transmitting module.

Further, the receiving terminal apparatus 144 further comprises:

a first receiving control unit, being configured to, when a retransmission packet from the transmitting terminal exists in the current frame, if determining that no data packet is lost within the retransmission range of the current frame according to statistics made according to the received radio packet, reject receiving the retransmission packet from the transmitting terminal; and/or a second receiving control unit, being configured to, after at least one retransmission packet of the current frame is received, if determining that no data packet is lost within the retransmission range of the current frame, reject continuing receiving the retransmission packet from the transmitting terminal; and/or a third receiving control unit, being configured to, when determining that the coming retransmission packets in the current frame do not comprise a required retransmission packet according to the known retransmission packet sequence adopted by the transmitting terminal, reject receiving the retransmission packet from the transmitting terminal.

What is described above is only preferred embodiments of the present invention but is not intended to limit the present invention. Any modifications, equivalent replacements, improvements and the like made within the spirit and the principle of the present invention shall all be covered within the scope of the present invention.

The invention claimed is:

1. A wireless digital communication method, comprising:
acquiring, by a processor, communication status indication information which indicates a receiving terminal status and/or a channel status;
generating, by the processor, frame structure adjustment information when the communication status indication information indicates that a communication status has changed, and transmitting, by the processor, the frame structure adjustment information to a corresponding receiving terminal, wherein the frame structure adjustment information comprises radio packet adjustment information; and
adjusting, by the processor, an adopted frame structure according to the frame structure adjustment information and performing data communication with the receiving terminal according to an adjusted frame structure;
wherein,
when said acquiring communication status indication information is acquiring the receiving terminal status of the receiving terminal that has been connected by detecting a connection status of the receiving terminal,
said generating frame structure adjustment information when it is known from the communication status indication information that a communication status has changed comprises: when previous communication status indication information indicates that the receiving terminal has been connected and current communication status indication information indicates that the receiving terminal is disconnected, the generated radio packet adjustment information indicates deleting a reply packet corresponding to the receiving terminal from the frame structure; and when the previous communication status indication information indicates that the receiving terminal is not connected and the current communication status indication information indicates that the receiving terminal is successfully connected, the generated radio packet adjustment information indicates adding the reply packet corresponding to the receiving terminal into the frame structure; and
wherein,
when said acquiring communication status indication information is according to the reply packet received from the receiving terminal, acquiring the receiving terminal status indicating whether the receiving terminal has successfully received a corresponding data packet,
said generating frame structure adjustment information when it is known from the communication status indication information that a communication status has changed comprises: in each frame period, when it is known from the communication status indication information that all data packets within an effective range of a retransmission function of a corresponding frame have been successfully received, the generated radio packet adjustment information indicates that the frame structure comprises no retransmission packet; or in each frame period, when it is known from the communication status indication information that a data packet is lost within the effective range of the retransmission function of the corresponding frame, determining an adopted retransmission packet sequence according to a retransmission strategy, wherein the generated radio packet adjustment information indicates a position of the data packet that corresponds to the retransmission packet in the frame structure; and said adjusting an adopted frame structure according to the frame structure adjustment information and performing data communication with the receiving terminal according to the adjusted frame structure comprises: in each frame period, adjusting the adopted frame structure according to the frame structure adjustment information, and transmitting a radio packet to the receiving terminal and receiving the reply packet from the receiving terminal according to the adjusted frame structure; and wherein, when said acquiring communication status indication information is acquiring a channel status indicating a current channel quality of a communication system by detecting the channel status, said generating frame structure adjustment information when it is known from the communication status indication information that a communication status has changed comprises: the frame structure adjustment information further comprises relative position adjustment information, which indicates a timing position of a period in which a frame structure change is performed relative to a period in which the corresponding frame structure adjustment information is transmitted, wherein the timing position has a value dependent on the channel quality in a manner such that when the channel quality indicated by first communication status indication information is higher than the channel quality indicated by second communication status indication information, the value of the timing position indicated by the relative position adjustment information generated according to the first communication status indication information is smaller than the value of the timing position indicated by the relative position adjustment information generated according to the second communication status indication information; and said adjusting an adopted frame structure according to the frame structure adjustment information and performing data communication with the receiving terminal according to the adjusted frame structure comprises: adjusting the adopted frame structure according to the frame structure adjustment information, and transmitting a radio packet to the receiving terminal and receiving the reply packet from the receiving terminal according to the adjusted frame structure when the period in which the frame structure change is performed comes.

2. The wireless digital communication method of claim 1, wherein, when the generated radio packet adjustment information indicates deleting the reply packet corresponding to the receiving terminal from the frame structure, the processor performs the following:

the radio packet adjustment information further indicating additionally providing in the frame structure a retransmission packet requiring radio bandwidth no larger than radio bandwidth occupied by the deleted reply packet, and/or adjusting a timing position of a reply packet, and the timing position of the replay packet needs to be received in the frame structure; and prohibiting receiving a reply packet at a position that corresponds to the receiving terminal in the reply packet of the frame structure at a time before adjusting the adopted frame structure according to the frame structure adjustment information; and releasing bandwidth resources allocated to the receiving terminal while or after adjusting the adopted frame structure according to the frame structure adjustment information;

when the generated radio packet adjustment information indicates adding a reply packet corresponding to the second receiving terminal into the frame structure, said method further comprises:

the radio packet adjustment information further indicating deleting from the frame structure a retransmission packet requiring radio bandwidth no smaller than radio bandwidth occupied by the added reply packet, and/or adjusting a timing position of a reply packet that needs to be received in the frame structure.

3. A wireless digital communication method, comprising:

receiving, by a processor, frame structure adjustment information from a transmitting terminal, wherein the frame structure adjustment information comprises radio packet adjustment information, the frame structure adjustment information is generated by the transmitting terminal according to communication status indication information when the transmitting terminal knows that a communication status has changed, and the communication status indication information indicates a receiving terminal status and/or a channel status; and adjusting, by the processor, an adopted frame structure according to the frame structure adjustment information and performing, by the processor, data communication with the transmitting terminal according to the adjusted frame structure; performing, by the processor, data communication with the transmitting terminal according to the adjusted frame structure comprises: in each frame period, adjusting, by the processor, the adopted frame structure according to the frame structure adjustment information consistent with the transmitting terminal, and receiving, by the processor, a radio packet from the transmitting terminal and transmitting, by the processor, a reply packet to the transmitting terminal according to the adjusted frame structure; and wherein, when the transmitting terminal generates the frame structure adjustment information according to the receiving terminal status of a receiving terminal that has been connected, if the previous communication status indication information indicates that at least one first receiving terminal has been connected, the current communication status indication information indicates that the first receiving terminal is disconnected, and the generated radio packet adjustment information indicates deleting a reply packet corresponding to the first receiving terminal from the frame structure, then said adjusting an adopted frame structure according to the frame structure adjustment information comprises: additionally providing in the frame structure a retransmission packet requiring radio bandwidth no larger than radio bandwidth occupied by all reply packets of the first receiving terminal, and/or adjusting in the frame structure a timing position at which the reply packet is transmitted according to the received radio packet adjustment information; and wherein,
when the transmitting terminal generates the frame structure adjustment information according to the receiving terminal status of a receiving terminal that has been connected, if the previous communication status indication information indicates that at least one second receiving terminal is not connected, the current communication status indication information indicates that the second receiving terminal is successfully connected, and the generated radio packet adjustment information indicates adding a reply packet corresponding to the second receiving terminal into the frame structure, then
said adjusting an adopted frame structure according to the frame structure adjustment information comprises deleting from the frame structure a retransmission packet requiring radio bandwidth no smaller than radio bandwidth occupied by all reply packets of the second receiving terminal, and/or adjusting in the frame structure a timing position at which the reply packet is transmitted according to the received radio packet adjustment information; and
wherein,
when the transmitting terminal generates the frame structure adjustment information according to the receiving terminal status indicating whether the receiving terminal has successfully received a corresponding data packet, said adjusting an adopted frame structure according to the frame structure adjustment information comprises:
the communication status indication information indicates that all data packets within the effective range of the retransmission function of the corresponding frame have been successfully received, and the frame structure adjusted according to the received radio packet adjustment information comprises no retransmission packet in this frame period; or
the communication status indication information indicates that a data packet is lost within the effective range of the retransmission function of the corresponding frame, an adopted retransmission packet sequence is known from the received radio packet adjustment information in each frame period, and a position of the data packet corresponding to the retransmission packet is adjusted in the frame structure according to the retransmission packet sequence.

4. The wireless digital communication method of claim 3, wherein, when the transmitting terminal generates the frame structure adjustment information according to an acquired channel status indicating the current channel quality of a communication system,
the frame structure adjustment information further comprises relative position adjustment information, which indicates a timing position of a period in which a frame structure change is performed relative to a period in which the corresponding frame structure adjustment information is transmitted; and
said adjusting an adopted frame structure according to the frame structure adjustment information and performing data communication with the transmitting terminal according to the adjusted frame structure comprises:
adjusting the adopted frame structure according to the frame structure adjustment information consistent with the transmitting terminal, and receiving a radio packet from the transmitting terminal and transmitting a reply packet to the transmitting terminal according to the adjusted frame structure when the period in which the frame structure change is performed and which is consistent with the transmitting terminal comes.

5. The wireless digital communication method of claim 3, further comprising:
when a retransmission packet from the transmitting terminal exists in the current frame, if it is determined that no data packet is lost within the retransmission range of the current frame according to statistics made according to the received radio packet, then rejecting receiving the retransmission packet from the transmitting terminal; or
after at least one retransmission packet of the current frame is received, if it is determined that no data packet is lost within the retransmission range of the current frame, then rejecting continuing receiving the retransmission packet from the transmitting terminal; or
when it is determined that the coming retransmission packets in the current frame do not comprise a required retransmission packet according to the known retransmission packet sequence adopted by the transmitting terminal, rejecting receiving the retransmission packet from the transmitting terminal.

6. The wireless digital audio transmission method of claim 3, further comprising:
for the radio packets of each frame received from the transmitting terminal, retransmitting the reply packet to the transmitting terminal for multiple times, wherein when there are multiple receiving terminals, the reply packet of each of the receiving terminals is retransmitted to the transmitting terminal for multiple times according to the timing positions, and two adjacent reply packets at the timing positions belong to different receiving terminals.

7. A wireless digital communication system, comprising a transmitting terminal apparatus and a receiving terminal apparatus, wherein:
the transmitting terminal apparatus comprises a processor configured to:
acquire communication status indication information which indicates a receiving terminal status and/or a channel status;
acquire the receiving terminal status of the receiving terminal that has been connected by detecting a connection status of the receiving terminal;
acquire the receiving terminal status indicating whether the receiving terminal has successfully received a corresponding data packet according to a reply packet received from the receiving terminal;
acquire a channel status indicating the current channel quality of the communication system by detecting the channel status;
generate frame structure adjustment information when knowing from the communication status indication information that a communication status has changed, and transmit the frame structure adjustment information to a corresponding receiving terminal, wherein the frame structure adjustment information comprises radio packet adjustment information, wherein the frame structure adjustment information includes relative position adjustment information, which indicates a timing position of a period in which a frame structure change is performed relative to a period in which the corresponding frame structure adjustment information is transmitted; and
configure generated radio packet adjustment information to indicate deleting a reply packet corresponding to the first receiving terminal from the frame structure when the previous communication status indication information indicates that at least one first receiving terminal has been connected and the current communication status indication information indicates that the first receiving terminal is disconnected;

configure the generated radio packet adjustment information to indicate adding a reply packet corresponding to the second receiving terminal into the frame structure, when the previous communication status indication information indicates that at least one second receiving terminal is not connected and the current communication status indication information indicates that the second receiving terminal is successfully connected;

configure the generated radio packet adjustment information to indicates that the frame structure comprises no retransmission packet, in each frame period, when knowing from the communication status indication information that all data packets within the effective range of the retransmission function of the corresponding frame have been successfully received;

configure the generated radio packet adjustment information to indicate a position of the data packet that corresponds to the retransmission packet in the frame structure, in each frame period, when knowing from the communication status indication information that a data packet is lost within the effective range of the retransmission function of the corresponding frame, determine an adopted retransmission packet sequence according to a retransmission strategy;

configure the timing position indicated by the relative position adjustment information generated according to the first communication status indication information to a value smaller than a value of the timing position indicated by the relative position adjustment information generated according to the second communication status indication information, when the channel quality indicated by the first communication status indication information is higher than the channel quality indicated by the second communication status indication information;

adjust an adopted frame structure according to the frame structure adjustment information and perform data communication with the receiving terminal according to the adjusted frame structure; and in each frame period, adjust the adopted frame structure according to the frame structure adjustment information, and transmit a radio packet to the receiving terminal and receive a reply packet from the receiving terminal according to the adjusted frame structure; and adjust the adopted frame structure according to the frame structure adjustment information, and transmit a radio packet to the receiving terminal and receive a reply packet from the receiving terminal according to the adjusted frame structure when the period in which the frame structure change is performed comes;

the receiving terminal apparatus comprises a processor configured to:

receive the frame structure adjustment information from the transmitting terminal, wherein the frame structure adjustment information comprises radio packet adjustment information; and adjust the adopted frame structure according to the frame structure adjustment information and perform data communication with the transmitting terminal according to the adjusted frame structure;

additionally provide in the frame structure a retransmission packet requiring radio bandwidth no larger than radio bandwidth occupied by all reply packets of the first receiving terminal, and/or adjust in the frame structure a timing position at which the reply packet is transmitted according to the received radio packet adjustment information;

delete from the frame structure a retransmission packet requiring radio bandwidth no smaller than radio bandwidth occupied by all reply packets of the second receiving terminal, and/or adjust in the frame structure a timing position at which the reply packet is transmitted according to the received radio packet adjustment information;

in each frame period, adjust the adopted frame structure according to the frame structure adjustment information consistent with the transmitting terminal, and receive a radio packet from the transmitting terminal and transmit a reply packet to the transmitting terminal according to the adjusted frame structure; and adjust the adopted frame structure according to the frame structure adjustment information consistent with the transmitting terminal, and receive a radio packet from the transmitting terminal and transmit a reply packet to the transmitting terminal according to the adjusted frame structure when the period in which the frame structure change is performed and which is consistent with the transmitting terminal comes.

8. The wireless digital communication system of claim 7, wherein the processor of the transmitting terminal apparatus is configured to:

acquire the receiving terminal status of the receiving terminal that has been connected by detecting a connection status of the receiving terminal;

when the previous communication status indication information indicates that at least one first receiving terminal has been connected and the current communication status indication information indicates that the first receiving terminal is disconnected, configure the radio packet adjustment information generated by the transmitting terminal apparatus to further indicates additionally providing in the frame structure a retransmission packet requiring radio bandwidth no larger than radio bandwidth occupied by the deleted reply packet, and/or adjusting a timing position of a reply packet that needs to be received in the frame structure; or when the previous communication status indication information indicates that at least one second receiving terminal is not connected and the current communication status indication information indicates that the second receiving terminal is successfully connected, configure the radio packet adjustment information generated by the to further indicate deleting from the frame structure a retransmission packet requiring radio bandwidth no smaller than radio bandwidth occupied by the added reply packet, and/or adjusting a timing position of a reply packet that needs to be received in the frame structure.

9. The wireless digital communication system of claim 8, wherein:

when the generated radio packet adjustment information indicates deleting a reply packet corresponding to the first receiving terminal from the frame structure, the processor of the transmitting terminal apparatus is further configured to:

prohibit receiving a reply packet at a position that corresponds to the first receiving terminal in the reply packet of the frame structure currently used before the adopted frame structure is adjusted according to the frame structure adjustment information; and release bandwidth resources allocated to the first receiving terminal while or after the adopted frame structure is adjusted according to the frame structure adjustment information.

10. The wireless digital communication system of claim 7, wherein the processor of the receiving terminal apparatus is further configured to:

when the current frame of the transmitting terminal comprises a retransmission packet, if determining that no data packet is lost within the retransmission range of the current frame according to statistics made according to the received radio packet, reject receiving the retransmission packet from the transmitting terminal; and/or after at least one retransmission packet of the current frame is received, if determining that no data packet is lost within the retransmission range of the current frame, reject continuing receiving the retransmission packet from the transmitting terminal; and/or when determining that coming retransmission packets in the current frame do not comprise a required retransmission packet according to the known retransmission packet sequence adopted by the transmitting terminal, reject receiving the retransmission packet from the transmitting terminal.

11. The wireless digital communication system of claim 7, wherein the processor of the receiving terminal apparatus is further configured to, for the radio packets of each frame received from the transmitting terminal, retransmit the reply packet to the transmitting terminal for multiple times, wherein when there are multiple receiving terminals, the reply packets of each of the receiving terminals is retransmitted to the transmitting terminal for multiple times according to the timing positions, and two adjacent reply packets at the timing positions belong to different receiving terminals.

* * * * *